United States Patent
Casati

(10) Patent No.: US 7,440,459 B2
(45) Date of Patent: Oct. 21, 2008

(54) METHODS OF DETECTING PROTOCOL SUPPORT IN WIRELESS COMMUNICATION SYSTEMS

(75) Inventor: Alessio Casati, Wootton Bassett (GB)

(73) Assignee: Lucent Technologies Inc., Murray Hill, NJ (US)

( * ) Notice: Subject to any disclaimer, the term of this patent is extended or adjusted under 35 U.S.C. 154(b) by 799 days.

(21) Appl. No.: 10/768,053

(22) Filed: Feb. 2, 2004

(65) Prior Publication Data
US 2005/0172012 A1    Aug. 4, 2005

(51) Int. Cl.
*H04L 12/28* (2006.01)
*H04L 12/56* (2006.01)

(52) U.S. Cl. ................ 370/395; 370/401; 370/481; 709/220

(58) Field of Classification Search ......... 370/337–349, 370/352–356, 395–401; 709/220–245; 455/433
See application file for complete search history.

(56) References Cited

U.S. PATENT DOCUMENTS

| | | | |
|---|---|---|---|
| 6,920,116 B1* | 7/2005 | Hossain et al. | 370/329 |
| 2004/0215794 A1* | 10/2004 | Lauer | 709/230 |
| 2004/0243720 A1* | 12/2004 | Haumont et al. | 709/245 |
| 2004/0266394 A1* | 12/2004 | Mizell et al. | 455/408 |
| 2005/0030920 A1* | 2/2005 | Garcia Cadarso et al. | 370/328 |
| 2005/0099990 A1* | 5/2005 | Uusikartano et al. | 370/349 |
| 2005/0122942 A1* | 6/2005 | Rhee et al. | 370/338 |
| 2005/0135428 A1* | 6/2005 | Hellgren | 370/481 |
| 2005/0169208 A1* | 8/2005 | Carrion-Rodrigo et al. | 370/328 |
| 2006/0092901 A1* | 5/2006 | Parantainen | 370/342 |
| 2006/0165027 A1* | 7/2006 | Heden | 370/328 |
| 2007/0025329 A1* | 2/2007 | Chen | 370/352 |
| 2007/0121647 A1* | 5/2007 | Wu | 370/401 |

FOREIGN PATENT DOCUMENTS

| | | |
|---|---|---|
| WO | WO 03/032604 | 4/2003 |
| WO | WO 01/45439 | 6/2006 |

OTHER PUBLICATIONS

"Digital cellular telecommunications system (Phase2+); Universal Mobile Telecommunications System (UMTS); General Packet Radio Service (GPRS); GPRS Tunnelling Protocol (GTP) across the Gn and Gp interface (3GPP TS 29. 060 version 5.8.0 Release 5); ESTI TS 129 060" ETSI Standards, European Telecommunications Standards Institute, Sophiaantipo, FR, vol. 3-CN2;3-CN4, No. V580, Dec. 2003, XP014017201 ISSN:0000-0001.

"Discussion paper on problems found when interworking GSNs of different GTP versions" 3GPP TSG CN WG4 Meeting #21, Oct. 31, 2003, XP002358172 Bamgkok.

European Search Report.

* cited by examiner

*Primary Examiner*—M. Phan

(57) ABSTRACT

In a method of detecting whether a given node supports a given protocol version, a source node sends a request message to the destination mode based on a first protocol version. The source node receives an indication message in reply to the request, and may detect that the destination node does not support the first protocol version based on the indication message. Accordingly communications may be established between a user of the wireless network and an external network via the source and destination nodes.

17 Claims, 2 Drawing Sheets

METHODS OF DETECTING PROTOCOL SUPPORT IN WIRELESS COMMUNICATION SYSTEMS

BACKGROUND OF THE INVENTION

1. Field of the Invention

The present invention relates generally to wireless communication systems.

2. Description of Related Art

The General Packet Radio Service (GPRS) is a 2.5G technology (bridging the gap between voice-centric, second generation (2G) wireless technologies and 3G wireless communications technologies) that allows short bursts of data between a mobile station and a network such as the Internet. The short transmissions allow for less costly connectivity than a constant connection, but work best with specialized services designed for such types of communication. GPRS has been supported by the Global System for Mobile communications (GSM), a 2G technology, beginning from Release 97 (R97), and by the 3G Universal Mobile Telecommunications Service (UMTS) beginning with the Third Generation Partnership Project (3GPP) Release 99 (R99).

Support of the GPRS requires that a Serving GPRS Support Node (SGSN) and a Gateway GPRS Support Node (GGSN) tunnel packets between each other using a protocol known as GPRS tunneling protocol (GTP). In general, SGSNs exchange packets with mobile stations over the radio access network (RAN) and GGSNs; GGSNs exchange packets with SGSNs and with other internet protocol (IP) networks, referred to as packet data networks. The SGSN and GGSN tunnel packets exchanged between them so that when a mobile station changes its point of attachment to the network (such as in the case when a mobile has moved, that is it has changed from one SGSN to another SGSN where it is located), packets may be sent to and received by the MS. The GTP allows for the set-up and maintenance of GTP tunnels via the GTP tunnel's own signalling. A GTP tunnel is a necessary mechanism in the forwarding of packets between an external packet data network and an MS user in GPRS and UMTS networks.

Before R99, the support of GPRS was based on the use of a GTP version known as GTPv0. GTPv0 is specified in the 3GPP Technical Specification entitled "GPRS Tunnelling Protocol (GTP) across the Gn and Gp Interface, (Release 1998)", 3G TS 09.060, Version 7.9.0 (2002-06) and earlier versions of 3G TS 09.060. Due to the need to support additional features allowed by the introduction of 3G systems such as UMTS, a revised protocol version has been developed, known as GTPv1. GTPv1 is specified in 3GPP Technical Specification entitled "GPRS Tunnelling Protocol (GTP) across the Gn and Gp interface (Release 6), 3G TS 29.060, V6.3.0 (2003-12) and earlier versions and Releases of 3G TS 29.060.

The GTPv0 protocol supported the tunnelling traffic (GTP tunnels used to carry MS traffic) and the tunnelling signalling (GTP used to set up and maintain GTP tunnels used to carry MS traffic) over the User Datagram Protocol (UDP) port 3386. The GTPv1 protocol supports tunnelling traffic (known as GTP-U) over UDP port 2152 and tunnelling signalling (known as GTP-C) over port 2123. GTP-U messages are exchanged between GSN pairs or GSN/RNC pairs in a path. A GTP-U message is a user plane messages that carries user data packets and signalling messages for path management and error indication. GTP-C messages are exchanged between GSN/RNC pairs in a path. GTP-C messages are control plane messages used to transfer GSN capability information between GSN pairs, to create, update and delete GTP tunnels and for path management, for example.

There is a current market requirement that wireless systems and technologies be able to support dual mode terminals (that is, to be able to support both a 2G GSM mobile station as well as a 3G UMTS mobile terminal) and also to permit an SGSN supporting both GTPv1 and GTPv0 to be able to contact a GGSN supporting only GTPv0, so as to allow for a smooth migration from GSM to UMTS.

However, for a node supporting both GTPv0 and GTPv1, the current way to 'fall back' to GTPv0 after trying to contact a GTPv0-only node is by waiting for a given number of timeouts to elapse and a number of attempts to fail using GTPv1, before GTPv0 may be used. This procedure is described in Section 11.1.1 of TS 29.060, entitled "Different GTP Versions".

It should be noted that this is due to the fact GTPv0 listens on port 3386 only and not on port 2123 the GTPv1 capable node uses to send GTPv1 signalling. In other words, GTPv1 runs on different UDP/IP ports than GTPv0, and the 3GPP standards (such as 3GPP TS 23.060 and 3GPP TS 29.060) do not clearly define how a GSN (such as an SSGN) discovers whether or not another GSN (such as a GGSN) supports GTPv1.

Ambiguities in the standards, coupled with the problem of excessive timeouts, may cause non-desirable delays. If the same port was used to exchange signalling in the two versions, then it would have been possible for the GTPv0 node to detect an incoming GTP packet of GTPv1 and to send back a "Version not supported message" as described in section 7.2.3 of TS 29.060. Since two completely different ports are being used, the GTPv0 node (whether an SGSN or GGSN) can only detect GTP traffic from GTPv0 nodes (On port 3386). The delay resulting from this scenario has been reason of concern in the industry and has recently been studied by the GSM Association (GSMA), which is a global trade association that represents the interests of more than 600GSM mobile operators. An October 2003 paper from the group, entitled "Discussion Paper on problems found when interworking GSNs of different GTP versions" and found at the link: http://www.3gpp.org/ftp/tsg_cn/WG4_protocollars/tsgN4_21_Bangkok/Tdocs/N4-031282.zip documents these concerns and illustrates these problems. The paper concludes that "The fact that the SGSN potentially has to wait for a specific time-out before dropping back to a lower protocol version is not acceptable".

SUMMARY OF THE INVENTION

The exemplary embodiments of the present invention are directed to a method of detecting lack of protocol support, a method of indicating that a given protocol version is not supported, and to a method of facilitating an activation routine to enable a user of a wireless network to make its presence known to a given external network. In general as part of each method, a source node sends a request message to a destination mode based on a first protocol version. The source node receives an indication message in reply to the request, and may detect that the destination node does not support the first protocol version based on the indication message. Accordingly, communications may be established more quickly between a user of the wireless network and an external network via the source and destination nodes.

BRIEF DESCRIPTION OF THE DRAWINGS

The exemplary embodiments of the present invention will become more fully understood from the detailed description given herein below and the accompanying drawings, wherein like elements are represented by like reference numerals, which are given by way of illustration only and thus are not limitative of the exemplary embodiments of the present invention and wherein.

DETAILED DESCRIPTION OF THE EXEMPLARY EMBODIMENTS

Although the following description of the present invention is based on the Universal Mobile Telecommunications System (UMTS) network infrastructure implementing a next generation Wideband Code Division Multiple Access (W-CDMA) air interface technology, it should be noted that the exemplary embodiments shown and described herein are meant to be illustrative only and not limiting in any way. As such, various modifications will be apparent to those skilled in the art.

Where used below, base station subsystem (BSS), base transceiver station (BTS) and Node-B are synonymous and may describe radio access equipment that provides data connectivity between a packet switched data network (PSDN) such as the Internet, and one or more mobile stations. Additionally where used below, the terms user equipment (UE) and mobile station (MS) may be interchangeable used. UE and MS are synonymous to user, subscriber, wireless terminal and remote station and describe a remote user of wireless resources in a wireless communication network.

Figure 1:
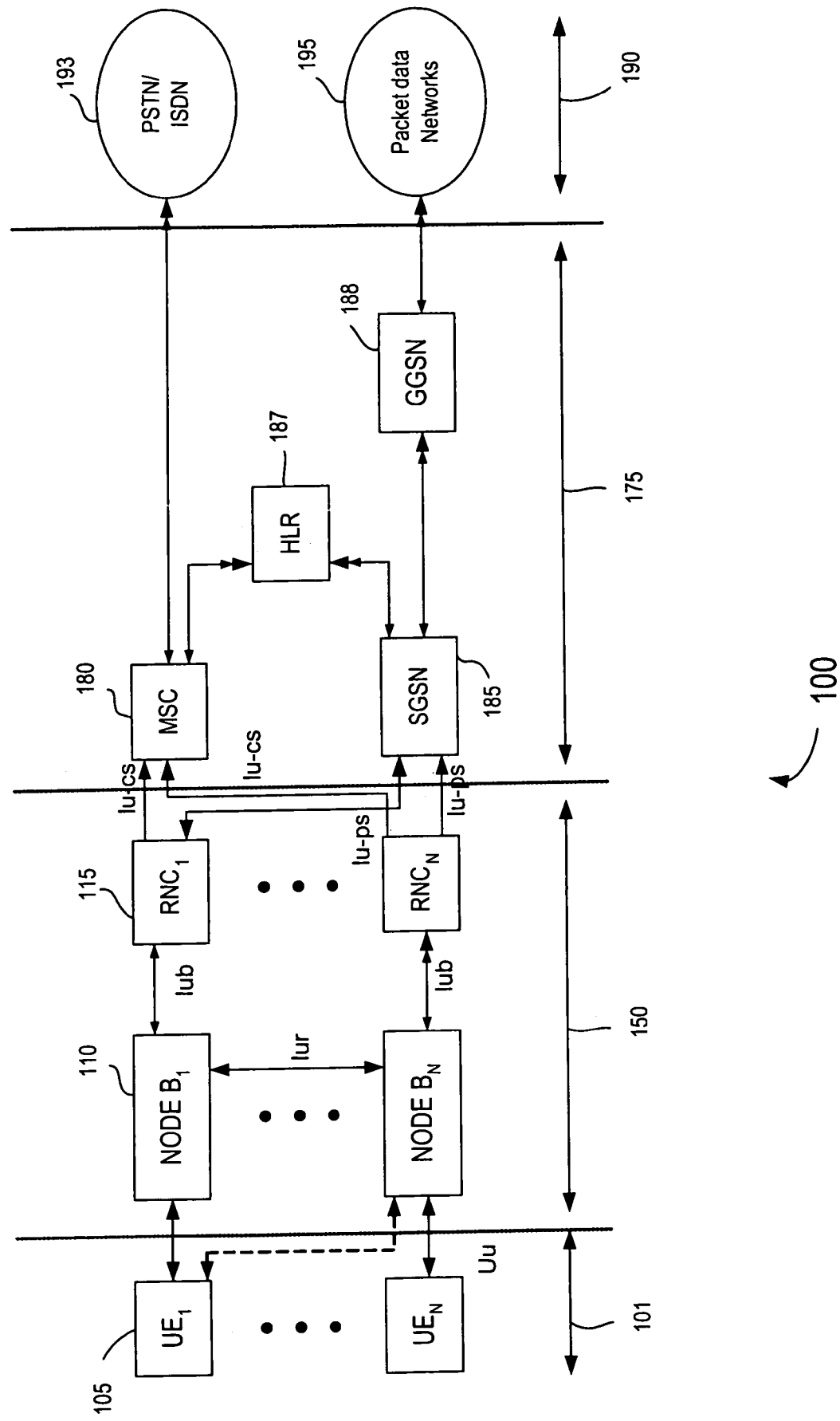
FIG. 1 illustrates a high-level diagram of the UMTS architecture, in accordance with an exemplary embodiment of the invention.

FIG. 1 illustrates a high-level diagram of the UMTS architecture, in accordance with an exemplary embodiment of the invention. This UMTS architecture is provided merely as an exemplary network or system architecture, it being understood that the exemplary embodiments of the present invention are applicable to GPRS. The UMTS architecture is provided in part to illustrate the packet switched side of a core network that may be common to GPRS and UMTS, for example.

Referring to FIG. 1, a UMTS architecture 100 comprises a radio access network part that may be referred to as a UMTS terrestrial radio access network (UTRAN) 150. The UTRAN 150 interfaces over a Uu air interface with a radio interface part 101; namely user equipments (UEs) such as mobile stations. The Uu air interface is the radio interface between the UTRAN 150 and one or more UEs 105. The Uu air interface enables interconnection of Node Bs with UEs, for example.

The UTRAN 150 also interfaces with one or more core networks (CNs) 175 (only one being shown in FIG. 1 for simplicity) via interfaces Iu-cs and Iu-ps, for example. Iu-cs, short for Interface Unit (Circuit Switched) interface, is the interface in UMTS which links the RNC with a Mobile Switching Center (MSC). Iu-ps, short for Interface Unit (Packet Switched) interface, is the interface in UMTS which links the RNC with a Serving GPRS Support Node (SGSN). Iu mode is independent of the support of both parts of the Iu interface, e.g. an SGSN (or GGSN) in Iu mode uses only an Iu-ps interface, whereas an MSC in Iu mode uses an Iu-cs (circuit-switched) interface.

CN 175 may include mobile switching centers (MSCs) 180, SGSNs 185 and Gateway GPRS serving/support nodes (GGSNs) 188. GGSN 188 are gateways to external networks 190. SGSNs 185 and GGSN 188 are of focus as the exemplary embodiments are directed to methods that may be implemented for packet switched applications. SGSNs and GGSNs, whether as part of a GPRS or UMTS structure, exchange packets with mobile stations over a RAN such as the UTRAN, and also exchange packets with other internet protocol (IP) networks (packet data networks). External networks 190 may include various circuit networks 193 such as a packet Switched Telephone Network (PSTN) 193 or Integrated Service Digital Network (ISDN) and packet data networks 195. UTRAN 150 may also be linked to the CN 175 via back-haul facilities (not shown) such as T1/E1, STM-x, etc., for example.

The UTRAN 150 may include cell sites, called Node Bs 110, which may serve a group of UEs 105, generally using a Uu interface protocol. A Node B 110 may contain radio transceivers that communicate using Iu-b protocol with radio network controllers (RNCs) 115 in UTRAN 150.

RNCs 115 within UTRAN 150 may communicate with each other using an Iu-r protocol, for example. The Iu-r enables interconnection of RNCs with each other. Several Node Bs 110 may interface with a single RNC 115 where, in additional to call setup and control activity, tasks such as radio resource management and frame selection in soft handoff may be carried out. Node Bs 110 and RNCs 115 may be connected via links that use ATM-based packet transport, for example.

The exemplary detection methods described hereafter may be implemented in the packet domain, for example. In general, the packet domain uses packet-mode techniques to transfer high-speed and low-speed data and signalling in an efficient manner. The packet domain is designed to optimize the use of network and radio resources. Strict separation between the radio subsystem and network subsystem is typically maintained, allowing the network subsystem to be reused with other radio access technologies.

A common packet domain core network (common to UMTS and GPRS, for example) may be used for both Radio Access Networks (RAN), such as the GERAN and the UTRAN. This common core network provides, together with these RANs, GPRS services. It is designed to support several quality of service (QoS) levels to allow efficient transfer of non real-time traffic (e.g. intermittent and bursty data transfers, occasional transmission of large volumes of data) and real-time traffic (e.g. voice, video). Applications based on standard data protocols and Short Message Services (SMS) may be supported, and interworking may be defined with Internet Protocol (IP) networks.

SGSN/GGSN General Functions

The SGSN keeps track of the location of an individual MS and performs security functions and access control. The SGSN may be connected to a GERAN base station subsystem (BSS) through the Gb interface (interface between BSS and the SGSN) or Iu interface, and/or to the UTRAN through the Iu interface. The GGSN provides interworking with packet data networks, and is connected with SGSNs via an IP-based packet domain Public Land Mobile Net (PLMN) backbone network.

Using GPRS Services

In order to use GPRS services, a MS first makes its presence known to the network by performing what is referred to as a GPRS attach. The attach enables the MS to be available for SMS over GPRS, paging via the SGSN, and notification of incoming packet data, for example. In order to send and receive packet data by means of GPRS services, the MS activates the Packet Data Protocol (PDP) context that it wants to use. PDP is a network protocol used by an external packet data network interfacing to GPRS. This operation makes the MS known in the corresponding GGSN, and interworking with data networks may commence.

User data may be transferred transparently between the MS and the packet data networks with a method known as encapsulation and tunnelling: data packets are equipped with GPRS-specific protocol information and transferred between the MS and the GGSN. This transparent transfer method lessens the requirement for the PLMN to interpret external data protocols, and may enable easy introduction of additional interworking protocols in the future.

A GPRS subscription contains the subscription of one or more PDP addresses. Each PDP address is an element of a PDP context. A PDP context may be described as information sets held in MS and GSNs for a PDP address, for example. The same PDP address may appear in one or more PDP contexts in the MS, the SGSN, and the GGSN. Each PDP context may be associated with a Traffic Flow Template (TFT). TFTs are used by the GGSN to distinguish between different user payload packets and transmit packets with different QoS requirements via different PDP contexts, but to the same PDP address. Every PDP context exists independently in one of two states (Active or Inactive). The PDP state indicates whether data transfer is enabled for that PDP address and TFT, or not.

Detection of lack of GTPv1 Support

Figure 2:
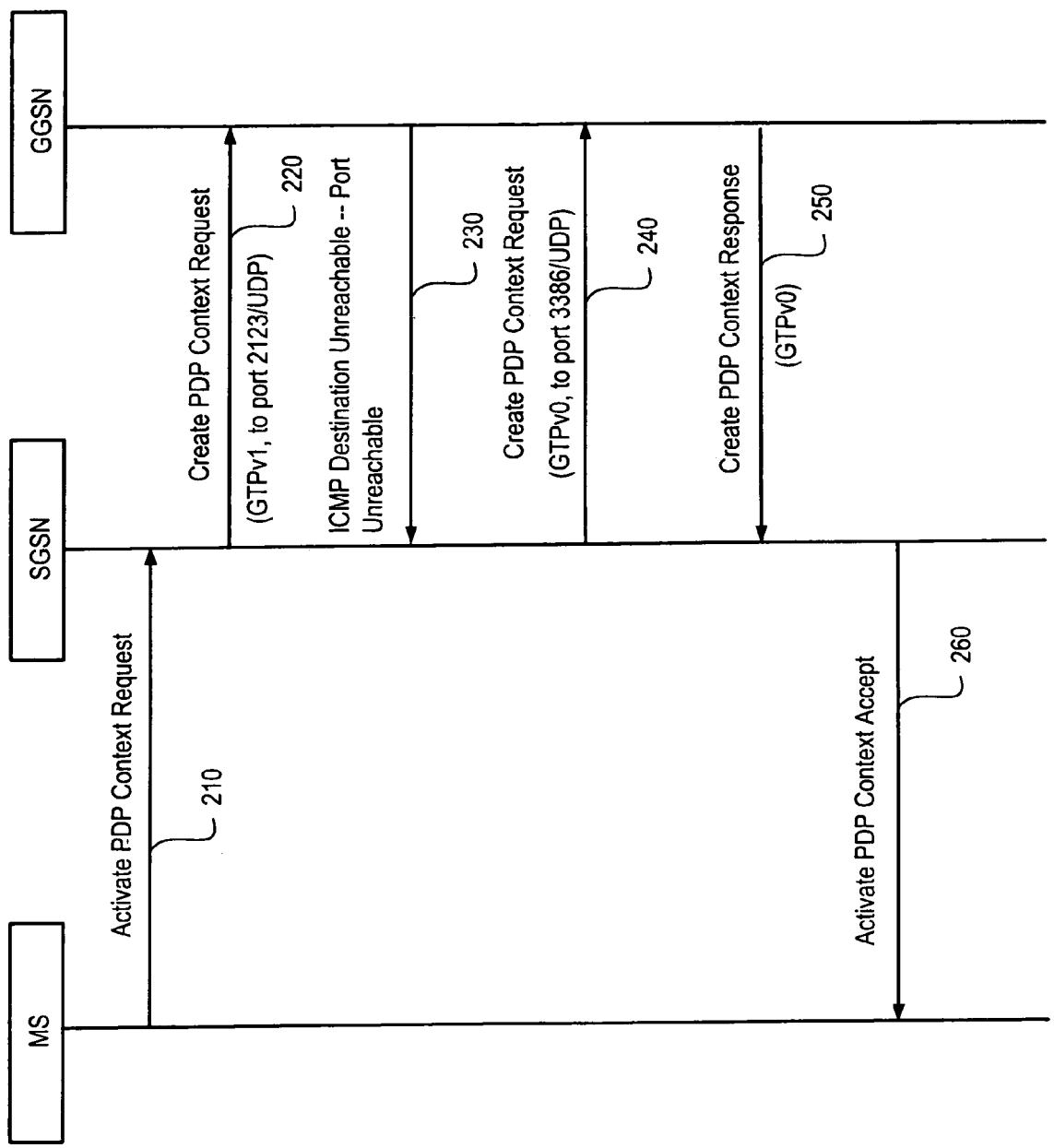
FIG. 2 is a signaling flow diagram to illustrate the methods in accordance with the exemplary embodiment of the present invention.

FIG. 2 is a signaling flow diagram to illustrate the methods in accordance with the exemplary embodiment of the present invention. FIG. 2 is provided to describe a method of detecting whether a given protocol version such as GTPv1 is not supported at a destination node, as well as a method by which a destination mode may indicate explicitly a lack of support of a given protocol version, such as GTPv1, for example. Further, FIG. 2 illustrates a method of facilitating a PDP context activation procedure used by the MS to make its presence known to an external network, for example. Each of these methods may reduce the delay in detecting lack of protocol version support, for example, as described above.

FIG. 2 illustrates a particular application (MS-initiated PDP context activation) as an exemplary application of the methods in accordance with the exemplary embodiments. It should be understood that the methods may be applicable to communication initiated between any GSN pair in either direction. Such as messages initiated from a GGSN using one protocol version to an SSGN using another protocol version, and between two SSGNs, each supporting a different protocol version.

Referring to FIG. 2, flows are shown between a MS and a SGSN and GGSN at the network in the context of the MS attempting a PDP Context Activation procedure. The MS initially attempts activating a PDP context (function 210). For example, the MS sends an Activate PDP Context Request message to the SGSN. The activation procedure for this may be as described in clause 9.2.2.2 of the 3GPP Technical Specification entitled "Technical Specification Group Services and System Aspects; General Packet Radio Service (GPRS); Service description; Stage 2 (Release 6)", 3GPP TS 23.060 V6.3.0 (2003-12), and earlier versions and releases of TS 23.060, for example.

As a part of the GPRS PDP Context Activation procedure, the SGSN will attempt to set up a PDP context by sending a Create PDP Request (function 220) to the GGSN using GTPv1. This is done on reserved UDP port 2123. After sending the Create PDP Context Request message, the SGSN marks the PDP context as 'waiting for response'. In this state the SGSN accepts G-PDUs from the GGSN, but does not send these G-PDUs to the MS. A valid request initiates the creation of a tunnel between a PDP Context in a SGSN and a PDP Context in a GGSN.

In this scenario, the GGSN only supports GTPv0, so it is not listening on port 2123 but on the port for GTPv0, port 3386. As currently specified in the standards, if the procedure is not successfully completed, (and it would not be in this case) the SGSN would continue to repeat the Create PDP Context Request message to a next GGSN address in the list of IP addresses, if there is one. If the list is exhausted the activation procedure fails, or the SGSN reaches timeout and starts again.

However, in accordance with the exemplary embodiments of the present invention, in FIG. 2 the GGSN returns a positive indicator message that the GTPv0 node is not listening on port 2123, the port used by GTPv1 capable nodes. This positive indicator may be embodied as an "ICMP Destination unreachable—port unreachable" message, for example that is sent to the SGSN (function 230). This is standard behavior specified in RFC 792—Internet Control Message Protocol (ICMP).

In general, a gateway or destination host such as a GGSN may communicate with a source host (SSGN), for example, to report an error in processing. ICMPs may be used for this purpose. The "ICMP Destination unreachable—port unreachable" message informs the source host (SSGN) that there is some error. In this example, the SGSN is ready to receive and interpret ICMP messages, and so the SSGN detects no application is running on the GTPv1 reserved port 2123. This may be interpreted as an explicit indication that the GTPv1 is not supported. Accordingly, the SSGN may immediately initiate a Create PDP Request (function 240) to the GGSN using GTPv0 on port 3386.

The GGSN receives the Create PDP Request on port 3386 and immediately responds to it by accepting the PDP context (function 250) set up based on GTPv0. The PDP context activation is confirmed (function 260) to the MS. In FIG. 2, this is shown by the an "Activate PDP Context Accept" message from SGSN to MS. Detailed explanation of the functionality of these message are not the subject of the present invention but may be implemented as described in Section 9.2 of 3GPP TS 23.060 V6.3.0 (2003-12), for example.

The methods described above may be applicable to network initiated communications, For example, in a case where there is a "network initiated PDP context activation", the GGSN initiates a procedure towards an SGSN. In such a case, where the GGSN finds out (from the HLR) to which SGSN the MS is attached, the GGSN sends a suitable message such as a PDU notification message. If the GGSN and SGSN support different protocol versions, (i.e., SGSN only supports GTPv0), then the same situation arises as described in FIG. 2. This situation may therefore be addressed as described with respect to the functions outlined in FIG. 2.

Similarly, in node to node communications between two SGSNs, there exist a case where the same incompatibility between protocol version may arise, when an SGSN using GTPv1 sends an SGSN Context Request to an SGSN that only supports GTPv0, for example. Accordingly, it should be understood that the methods describe herein may address the case in which two SGSNs attempting to communicate with each other support different protocols.

Accordingly, the exemplary embodiments describe a method which may solve several problems the industry is facing. It is believed that using an indicator or error message such as "ICMP destination unreachable-port unreachable" to detect lack of GTPv1 support has not heretofore been investigated. Rapid detection of lack of GTPv1 support and fallback to GTPv0 based communication between GPRS support nodes may help to avoid lengthy delays in PDP context setup. This may improve user experience. The reduction in PDP context setup latency could potentially be quite substantial (such as a few order of magnitudes).

The exemplary embodiments of the present invention being thus described, it will be obvious that the same may be varied in many ways. Such variations are not to be regarded as a departure from the spirit and scope of the exemplary embodiments of the present invention, and all such modifications as would be obvious to one skilled in the art are intended to be included within the scope of the following claims.

What is claimed is:

1. A method by which a source node of a wireless network detects whether a destination node supports a given protocol version, so as to establish communications, via the source and destination nodes between a user of the wireless network and an external network, comprising:
sending a request message from the source node to the destination node based on a first protocol version that is not supported by the destination node;
receiving, at the source node, an indication message, the indication message being according to a second protocol version used for sending the request message in reply to the request;
detecting that the destination node does not support the first protocol version based on the indication message; and
re-sending the request message from the source node to the destination mode as a second protocol version supported by the destination node so as to facilitate the setting up of communications between the user and network.

2. The method of claim 1, wherein said first protocol version is a General Packet Radio Service (GPRS) tunneling protocol, Version 1 (GTPv1) for supporting GPRS in third generation wireless communication systems, and said second protocol version is (GTPv0), for supporting GPRS in Global System for Mobile communications (GSM) systems.

3. The method of claim 1, wherein said indication message is an Internet Control Message Protocol (ICMP) "destination unreachable port unreachable" message.

4. The method of claim 3, wherein said detecting includes determined, based on receipt of said ICMP message, that said first protocol version is not supported at said destination node.

5. The method of claim 1, wherein said wireless network includes a core network configured to support at least General Packet Radio Service (GPRS) services.

6. The method of claim 1, wherein said source and destination nodes are SGSNs that support different protocol versions.

7. The method of claim 1, wherein said source node is a SGSN and said destination node is a GGSN.

8. The method of claim 1, wherein said source node is a GGSN and said destination node is a SGSN.

9. A method by which a destination node indicates that it does not support a given protocol version to a source node of a wireless network, comprising:
receiving a request message from the source node that is based on a first protocol version not supported by the destination node, the request message for establishing communications, via the source and destination nodes between a user of the wireless network and an external network; and
sending an indication message being according to a second protocol version in reply that informs the source node that the first protocol version is not supported by the destination node, so as to enable the source node to re-send the request message using the second protocol version supported by the destination node.

10. The method of claim 9, wherein said first protocol version is a General Packet Radio Service (GPRS) tunneling protocol, Version 1 (GTPv1) for supporting GPRS in third generation wireless communication systems, and said second protocol version is (GTPv0), for supporting GPRS in Global System for Mobile communications (GSM) systems.

11. The method of claim 9, wherein said indication message is an Internet Control Message Protocol (ICMP) "destination unreachable port unreachable" message.

12. The method of claim 9, wherein said source and destination nodes are SGSNs using different protocol versions.

13. The method of claim 9, wherein said source node is one of a SGSN or GGSN and said destination node is one of a GGSN or SGSN.

14. A method of facilitating an activation routine to enable a user of a wireless network to make its presence known to a given external network, comprising:
sending an activation message from the user to a source node of the wireless network to establish communications between the source node and a destination node that enables access to the external network;
sending a request message from the source node to the destination mode based on a first protocol version that is not supported by the destination node;
receiving an indication message at the source node in reply to the request message that informs the source node that the first protocol version is not supported by the destination node; and
re-sending the request message from the source node to the destination mode at a second protocol version supported by the destination node,
responding to the source node with an accept message, and
confirming the activation message at the source node so that the user's presence is known to the external network.

15. The method of claim 14, wherein said first protocol version is a General Packet Radio Service (GPRS) tunneling protocol, Version 1 (GTPv1) for supporting GPRS in third generation wireless communication systems, and said second protocol version is (GTPv0), for supporting GPRS in Global System for Mobile communications (GSM) systems.

16. The method of claim 14, wherein said indication message is an Internet Control Message Protocol (ICMP) destination unreachable port unreachable message which represents, to the source node, that said first protocol version is not supported at said destination node.

17. The method of claim 14, wherein said source node is one of a SGSN or GGSN and said destination node is one of a GGSN or SGSN.

* * * * *